US006534593B1

(12) United States Patent
Komatsuzaki et al.

(10) Patent No.: US 6,534,593 B1
(45) Date of Patent: Mar. 18, 2003

(54) BLOCK COPOLYMER COMPOSITION, PROCESS FOR PRODUCING THE SAME, AND PRESSURE-SENSITIVE ADHESIVE COMPOSITION

(75) Inventors: Shigeru Komatsuzaki, Yokohama (JP); Tetsuaki Matsubara, Kawasaki (JP); Jun Ishihara, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/700,119

(22) PCT Filed: May 13, 1999

(86) PCT No.: PCT/JP99/02465

§ 371 (c)(1),
(2), (4) Date: Feb. 1, 2001

(87) PCT Pub. No.: WO99/58605

PCT Pub. Date: Nov. 18, 1999

(30) Foreign Application Priority Data

May 13, 1998 (JP) ............................................. 10-148461

(51) Int. Cl.$^7$ ................................................. C08L 53/02
(52) U.S. Cl. ............................. 525/89; 525/98; 525/99
(58) Field of Search ................................ 525/89, 98, 99

(56) References Cited

U.S. PATENT DOCUMENTS 5,266,648 A * 11/1993 Masse
5,372,870 A * 12/1994 Diehl et al.
5,399,627 A * 3/1995 Diehl et al.
5,552,493 A 9/1996 Spence et al.
5,668,208 A 9/1997 Viola et al.
6,291,583 B1 9/2001 Komatsuzaki et al.

FOREIGN PATENT DOCUMENTS

| JP | 1-266156 | | 10/1989 |
| JP | 060279744 | * | 4/1994 |
| JP | 10-158350 | | 6/1998 |

* cited by examiner

*Primary Examiner*—Jeffrey Mullis
(74) *Attorney, Agent, or Firm*—Armstrong, Westerman & Hattori, LLP

(57) ABSTRACT

The present invention provides a composition which comprises a radial poly(aromatic vinyl)/polyisoprene block copolymer as a major component and which can be used as a more excellent pressure-sensitive ingredient. This composition is obtained by reacting a diblock polymer with a coupling agent having a functionality of 4 or higher in the presence of a coupling accelerator, and it contains (a) 1 to 34% by weight of a diblock polymer, (b) 34 to 99% by weight of a four-branch polymer, and (c) 0 to 50% by weight of a two-branch polymer and/or a three-branch polymer. The poly(aromatic vinyl)/polyisoprene block copolymer contained in the composition has a weight-average molecular weight (Mw) of 260,000 to 500,000, and the poly(aromatic vinyl)/polyisoprene block copolymer has a poly(aromatic vinyl) block content of 5 to 24% by weight.

23 Claims, No Drawings

BLOCK COPOLYMER COMPOSITION, PROCESS FOR PRODUCING THE SAME, AND PRESSURE-SENSITIVE ADHESIVE COMPOSITION

TECHNICAL FIELD

This invention relates to poly(aromatic vinyl)/polyisoprene block copolymer compositions suitable for pressure-sensitive adhesive use, a process for producing the same, and pressure-sensitive adhesive compositions containing such block copolymer compositions.

BACKGROUND ART

Conventionally, various block copolymers including polystyrene/polyisoprene block copolymers have been used as base polymers for pressure-sensitive adhesive compositions. Moreover, it is also known that radial polystyrene/polyisoprene block copolymers represented by the following formula are used for such purposes.

$$(S-I)_nX$$

wherein S is a polystyrene block, I is a polyisoprene block, n is a natural number of 3 or greater, and X is a residue of a coupling agent.

Various coupling agents are used for the production of radial block copolymers. From the viewpoint of reactivity, bond stability, stabilized supply, cost and the like, tetrafunctional silicon compounds are among the most preferred coupling agents. Accordingly, several attempts have been made to synthesize a styrene/isoprene block copolymer for pressure-sensitive adhesive use by using a tetrafunctional silicon compound as a coupling agent (see, for example, Japanese Patent Laid-Open No. 266156 /'89, Japanese Patent Laid-Open No. 138547/'95, and Published Japanese Translation of PCT International Publication No. 511260/'97). In these attempts, however, the resulting copolymer scarcely contains a four-branch polymer in spite of the use of a tetrafunctional coupling agent, and its principal component is a three-branch polymer.

It is disclosed in Japanese Patent Laid-Open No. 337625/'96 that a radial polystyrene/polyisoprene block copolymer can be obtained by reacting polyisoprene with a silicon tetrachloride coupling agent, and then adding thereto a cyclohexane solution of a separately formed polystyrene/polyisoprene block copolymer and a coupling accelerator comprising 1,2-dimethoxyethane. However, this radial polystyrene/polyisoprene block copolymer is an unsymmetrical block copolymer consisting of two polyisoprene arms and two polystyrene/polyisoprene block copolymer arms.

It is disclosed in Published Japanese Translation of PCT International Publication No. 511260/'97 that a block copolymer composition having a four-branch structure as a principal component can be obtained by introducing a small amount of polybutadiene chains at the polymerizing end of the diblock polymer and then reacting the resulting copolymer with a tetrafunctional coupling agent to form a four-branch polymer. However, its adhesive properties are markedly reduced by the influence of the polybutadiene chains, and the resulting pressure-sensitive adhesive composition fails to have satisfactory performance.

WO98/18840 discloses a poly(aromatic vinyl)/polyisoprene block copolymer comprising 5 to 50% by weight of a four-branch polymer and 50 to 95% by weight of a diblock polymer, and a pressure-sensitive adhesive composition containing this block copolymer. However, from the viewpoint of the balance between tack at low temperatures and holding power, there is yet room for improvement in this poly(aromatic vinyl)/polyisoprene block copolymer.

An object of the present invention is provide a radial poly(aromatic vinyl)/polyisoprene block copolymer composition having a well-balanced combination of tack at low temperatures and holding power and exhibiting high values therefor, a process for producing the same, and a pressure-sensitive adhesive composition using the same.

DISCLOSURE OF THE INVENTION

The present inventors made intensive investigations with a view to accomplishing the above object. As a result, it has now been found that a poly(aromatic vinyl)/polyisoprene block copolymer composition comprising (a) 1 to 34% by weight of a diblock polymer, (b) 34 to 99% by weight of a four-branch polymer, and (c) 0 to 50% by weight of at least one branched polymer selected from the group consisting of a two-branch polymer and a three-branch polymer can readily be obtained by preparing a poly(aromatic vinyl)/polyisoprene block copolymer comprising a diblock copolymer having a poly(aromatic vinyl) block A and a polyisoprene block B joined to each other, and then reacting it with a coupling agent having a functionality of 4 or higher, and that a pressure-sensitive adhesive agent comprising this poly(aromatic vinyl)/polyisoprene block copolymer composition and a tackifier resin provides an excellent adhesive.

Thus, according to the present invention, there is provided a poly(aromatic vinyl)/polyisoprene block copolymer composition comprising 1 to 34% by weight of a diblock polymer represented by the following General Formula 1 and referred to as component (a), 34 to 99% by weight of a four-branch polymer represented by the following General Formula 2 and referred to as component (b), and 0 to 50% by weight of at least one branched polymer selected from the group consisting of a two-branch polymer represented by the following General Formula 3 and a three-branch polymer represented by the following General Formula 4, and referred to as component (c), wherein the poly(aromatic vinyl)/polyisoprene block copolymer composed of component (a), component (b) and component (c) has a weight-average molecular weight (Mw) of 260,000 to 500,000, and the poly(aromatic vinyl)/polyisoprene block copolymer has a poly(aromatic vinyl) block content of 5 to 24% by weight.

$$A^1\text{-}B^1 \qquad \text{General Formula 1}$$

wherein $A^1$ is a poly(aromatic vinyl) block having a weight-average molecular weight (Mw) of 9,000 to 20,000, and $B^1$ is a polyisoprene block.

$$(A^2\text{-}B^2)_4X^2 \qquad \text{General Formula 2}$$

wherein $A^2$ is a poly(aromatic vinyl) block having a weight-average molecular weight (Mw) of 9,000 to 20,000, $B^2$ is a polyisoprene block, and $X^2$ is a residue of a coupling agent having a functionality of 4 or higher.

$$(A^3\text{-}B^3)_2X^3 \qquad \text{General Formula 3}$$

wherein $A^3$ is a poly(aromatic vinyl) block, $B^3$ is a polyisoprene block, and $X^3$ is a residue of a coupling agent having a functionality of 2 or higher.

$$(A^4\text{-}B^4)_3X^4 \qquad \text{General Formula 4}$$

wherein $A^4$ is a poly(aromatic vinyl) block, $B^4$ is a polyisoprene block, and $X^4$ is a residue of a coupling agent having a functionality of 3 or higher.

Moreover, according to the present invention, there is also provided a process for producing a poly(aromatic vinyl)/polyisoprene block copolymer composition, the process comprising the steps of (1) bringing an organolithium initiator into contact with an aromatic vinyl monomer to form a poly(aromatic vinyl) block A having an active polymerizing end, (2) adding isoprene so as to form an A-B block copolymer in which a polyisoprene block B having an active polymerizing end is directly joined to the poly(aromatic vinyl) block A, and (3) reacting the A-B block copolymer with a coupling agent having a functionality of 4 or higher in the presence of a coupling accelerator so as to convert 34 to 99% by weight of the A-B block copolymer into the four-branch polymer represented by General Formula 2.

Furthermore, according to the present invention, there is also provided a pressure-sensitive adhesive composition comprising the poly(aromatic vinyl)/polyisoprene block copolymer composition and a tackifier resin.

EMBODIMENTS OF THE INVENTION

[(a) Diblock Polymer]

The diblock polymer used as component (a) in the present invention is a diblock polymer represented by the following General Formula 1, and a residue of a coupling agent may be added to an end of the polyisoprene block $B^1$.

$$A^1\text{-}B^1 \qquad \text{General Formula 1}$$

wherein $A^1$ is a poly(aromatic vinyl) block and $B^1$ is a polyisoprene block.

No particular limitation is placed on the type of the aromatic vinyl monomer used for the synthesis of the diblock polymer. Specific examples thereof include styrene, α-methylstyrene, vinyltoluene and vinylnaphthalene, and styrene is preferred. These aromatic vinyl monomers may be used in admixture of two or more.

No particular limitation is placed on the proportion of the poly(aromatic vinyl) block $A^1$ in the diblock polymer. Since the poly(aromatic vinyl) block content of the block copolymer composed of components (a), (b) and (c) as will be described later is usually in the range of 5 to 24% by weight, preferably 10 to 18% by weight, and more preferably 11 to 14% by weight, it is preferable to determine its proportion so as to satisfy that condition. Usually, the proportion of the poly(aromatic vinyl) block $A^1$ in the diblock polymer is preferably in the range of 5 to 24% by weight, more preferably 10 to 18% by weight, and most preferably 11 to 14% by weight.

No particular limitation is placed on the molecular weight of the diblock polymer. However, since the weight-average molecular weight (Mw) of the block copolymer composed of components (a), (b) and (c) in the present invention is limited as will be described later, it is necessary to determine the molecular weight of the diblock polymer so as to satisfy that condition. When the block copolymer composition of the present invention is produced by the production process of the present invention which will be described later, the weight-average molecular weight (Mw) of the diblock polymer as determined on a polystyrene basis by gel permeation chromatography (GPC) is usually in the range of 60,000 to 250,000, preferably 70,000 to 230,000, and more preferably 80,000 to 220,000.

The weight-average molecular weight (Mw) of the poly(aromatic vinyl) block A of the diblock polymer as determined on a polystyrene basis by gel permeation chromatography (GPC) is usually in the range of 9,000 to 20,000, preferably 9,500 to 17,000, and more preferably 10,000 to 15,000. If the weight-average molecular weight of the poly(aromatic vinyl) block $A^1$ is unduly low, the resulting pressure-sensitive adhesive composition will show a reduction in holding power. Conversely, if it is unduly high, the resulting pressure-sensitive adhesive composition will show a reduction in tack.

No particular limitation is placed on the process for the preparation of the diblock polymer. Usually, an organolithium initiator is brought into contact with an aromatic vinyl monomer to form a poly(aromatic vinyl) block $A^1$ having an active polymerizing end. Then, isoprene is added to the reaction system so as to form a diblock polymer $A^1\text{-}B^1$ in which a polyisoprene block $B^1$ having an active polymerizing end is directly joined to the poly(aromatic vinyl) block $A^1$. The organolithium initiator and other materials used for this purpose are the same as the organolithium initiator and other materials used in the process for producing the block copolymer of the present invention which will be described later.

[(b) Four-branch Polymer]

The four-branch polymer constituting component (b) of the block copolymer composition of the present invention has a structure represented by the following General Formula 2.

$$(A^2\text{-}B^2)_4X^2 \qquad \text{General Formula 2}$$

wherein $A^2$ is a poly(aromatic vinyl) block, $B^2$ is a polyisoprene block, and $X^2$ is a residue of a coupling agent having a functionality of 4 or higher.

The aromatic vinyl monomer used for the four-branch polymer may be the same as the aromatic vinyl monomer used for the preparation of the diblock polymer.

The weight-average molecular weight (Mw) of the poly(aromatic vinyl) block $A^2$ in the four-branch polymer is similar to the weight-average molecular weight (Mw) of the poly(aromatic vinyl) block A of the diblock polymer.

The proportion of the poly(aromatic vinyl) block $A^2$ in the four-branch polymer is similar to the proportion of the poly(aromatic vinyl) block $A^1$ of the diblock polymer.

The four-branch polymer is formed by reacting a $A^2\text{-}B^2$ block copolymer being a diblock polymer with a coupling agent having a functionality of 4 or higher and preferably a tetrafunctional coupling agent.

[(c) Two-branch Polymer and Three-branch Polymer]

The block copolymer composition of the present invention may contain at least one branched polymer selected from the group consisting of a two-branch polymer represented by the following General Formula 3 and a three-branch polymer represented by the following General Formula 4.

$$(A^3\text{-}B^3)_2X^3 \qquad \text{General Formula 3}$$

wherein $A^3$ is a poly(aromatic vinyl) block, $B^3$ is a polyisoprene block, and $X^3$ is a residue of a coupling agent having a functionality of 2 or higher.

$$(A^4\text{-}B^4)_3X^4 \qquad \text{General Formula 4}$$

wherein $A^4$ is a poly(aromatic vinyl) block, $B^4$ is a polyisoprene block, and $X^4$ is a residue of a coupling agent having a functionality of 3 or higher.

The aromatic vinyl monomer used for the two-branch polymer and the three-branch polymer may be the same as the aromatic vinyl monomer used for the diblock polymer.

The weight-average molecular weights (Mw) of the poly(aromatic vinyl) blocks $A^3$ and $A^4$ in the two-branch polymer and the three-branch polymer are both similar to the weight-average molecular weight of the poly(aromatic vinyl) block $A^1$ of the diblock polymer.

The proportion of the poly(aromatic vinyl) block $A^3$ in the two-branch polymer and the proportion of the poly(aromatic vinyl) block $A^4$ in the three-branch polymer are both similar to the proportion of the poly(aromatic vinyl) block $A^1$ of the diblock polymer.

[Block Copolymer Composition]

The poly(aromatic vinyl)/polyisoprene block copolymer composition of the present invention comprises the diblock polymer constituting component (a) in an amount of 1 to 34% by weight, preferably 1 to 30% by weight, and more preferably 1 to 20% by weight; the four-branch polymer constituting component (b) in an amount of 34 to 99% by weight, preferably 45 to 99% by weight, and more preferably 55 to 99% by weight; and at least one branched polymer selected from the group consisting of the two-branch polymer and the three-branch polymer, and constituting component (c), in an amount of 0 to 50% by weight, preferably 0 to 40% by weight, and more preferably 0 to 30% by weight, provided that the amount of component (c) is less than the amount of component (b). Moreover, the amount of the two-branch polymer is preferably not greater than 10% by weight, more preferably not greater than 2% by weight, and most preferably not greater than 1.5% by weight. Furthermore, the amount of component (b) based on the total amount of components other than the diblock polymer constituting component (a) in the block copolymer composition is preferably not less than 50% by weight, more preferably not less than 55% by weight, and most preferably not less than 60% by weight.

If the amount of component (a) in the block copolymer composition is unduly large, the holding power will be reduced. If the amount of component (b) in the block copolymer composition is unduly small, the holding power will be reduced. If the amount of component (c) in the block copolymer composition is unduly large, the effects of the present invention will be lessened. Especially if the amount of the two-branch polymer is unduly large, the effects of the present invention will be lessened.

The weight-average molecular weight (Mw) of the block copolymer composed of components (a), (b) and (c), as determined on a polystyrene basis by gel permeation chromatography (GPC), is in the range of 260,000 to 500,000, preferably 260,000 to 470,000, more preferably 280,000 to 450,000, and most preferably 300,000 to 450,000. If this weight-average molecular weight is unduly low, the holding power will be reduced. If it is unduly high, the viscosity will be increased to cause a reduction in processability.

No particular limitation is placed on the molecular weight distribution of the block copolymer composed of components (a), (b) and (c). However, the ratio (Mw/Mn) of the weight-average molecular weight (Mw), as determined on a polystyrene basis by gel permeation chromatography (GPC), to the number-average molecular weight (Mn) is preferably not greater than 4, more preferably not greater than 3, and most preferably not greater than 2. In such a case, the pressure-sensitive adhesive composition formed therefrom preferably has a highly balanced combination of holding power and tack.

The poly(aromatic vinyl) block content of the poly (aromatic vinyl)/polyisoprene block copolymer composed of components (a), (b) and (c) is in the range of 5 to 24% by weight, preferably 10 to 18% by weight, and more preferably 11 to 14% by weight. If the poly(aromatic vinyl) block content of the poly(aromatic vinyl)/polyisoprene block copolymer composed of components (a), (b) and (c) is unduly low, the resulting pressure-sensitive adhesive composition will have insufficient holding power. If it is unduly high, the resulting pressure-sensitive adhesive composition will have insufficient tack.

[Process for Producing the Block Copolymer Composition]

No particular limitation is placed on the process for producing the poly(aromatic vinyl)/polyisoprene block copolymer composition of the present invention. For example, the block copolymer composition of the present invention may be prepared by separately synthesizing (a) a diblock polymer, (b) a four-branch polymer, and optionally (c) at least one branched polymer selected from a two-branch polymer and a three-branch polymer, purifying these polymers, and mixing these polymers in predetermined proportions. Alternatively, the block copolymer composition of the present invention may also be produced according to the production process of the present invention which comprises the steps of (1) bringing an organohthium initiator into contact with an aromatic vinyl monomer to form a poly (aromatic vinyl) block A having an active polymerizing end, (2) adding isoprene so as to form an A-B block copolymer in which a polyisoprene block B having an active polymerizing end is directly joined to the poly(aromatic vinyl) block A, and (3) reacting the A-B block copolymer with a coupling agent having a functionality of 4 or higher in the presence of a coupling accelerator so as to convert 34 to 99% by weight of the A-B block copolymer into the four-branched polymer represented by General Formula 2.

The poly(aromatic vinyl)/polyisoprene block copolymer composition produced by the production process of the present invention is a poly(aromatic vinyl)/polyisoprene block copolymer composition comprising 1 to 34% by weight of a diblock polymer represented by the following General Formula 5 and referred to as component (X), 34 to 99% by weight of a four-branched polymer represented by the following General Formula 6 and referred to as component (Y), and 0 to 50% by weight of at least one branched polymer selected from the group consisting of a two-branched polymer represented by the following General Formula 7 and a three-branched polymer represented by the following General Formula 8, and referred to as component (Z).

$$A^5\text{-}B^5 \qquad\qquad \text{General Formula 5}$$

wherein $A^5$ is a poly(aromatic vinyl) block, and $B^5$ is a polyisoprene block.

$$(A^6\text{-}B^6)_4 X^6 \qquad\qquad \text{General Formula 6}$$

wherein $A^6$ is a poly(aromatic vinyl) block, $B^6$ is a polyisoprene block, and $X^6$ is a residue of a coupling agent having a functionality of 4 or higher.

$$(A^7\text{-}B^7)_2 X^7 \qquad\qquad \text{General Formula 7}$$

wherein $A^7$ is a poly(aromatic vinyl) block, $B^7$ is a polyisoprene block, and $X^7$ is a residue of a coupling agent having a functionality of 2 or higher.

$$(A^8\text{-}B^8)_3 X^8 \qquad\qquad \text{General Formula 8}$$

wherein $A^8$ is a poly(aromatic vinyl) block, $B^8$ is a polyisoprene block, and X8 is a residue of a coupling agent having a functionality of 3 or higher.

The production process of the present invention makes it possible to produce poly(aromatic vinyl)/polyisoprene block copolymer compositions containing a high proportion of the four-branch polymer represented by General Formula 6.

Step (1) in the production process of the present invention is a step for forming a poly(aromatic vinyl)/polyisoprene block copolymer composition. This step is carried out by bringing an organolithium initiator into contact with an aromatic vinyl monomer in a polymerization solvent so as to polymerize the aromatic vinyl monomer, and the poly (aromatic vinyl) block A so formed has an active polymerizing end.

As the organolithium initiator, there may be used any well-known organolithium compound that can initiate the polymerization of aromatic vinyl monomers and isoprene. Specific examples thereof include organo-monolithium initiators such as methyllithium, n-propyllithium, n-butyllithium and sec-butyllithium. Among them, n-butyllithium is preferred. The amount of organolithium initiator used can be determined by calculation according to the desired molecular weight of the polymer, in a manner well known to those skilled in the art.

The aromatic vinyl monomer used is the same as the aromatic vinyl monomer used for the preparation of the diblock polymer.

No particular limitation is placed on the type of the polymerization solvent, provided that it is inert to the organolithium initiator. For example, there is used an open-chain hydrocarbon solvent, a cyclic hydrocarbon solvent or a mixture thereof. Examples of the open-chain hydrocarbon solvent include open-chain alkanes and alkenes of 4 to 6 carbon atoms, such as n-butane, isobutane, n-hexane and mixtures thereof; 1-butene, isobutylene, trans-2-butene, cis-2-butene and mixtures thereof; n-pentane, trans-2-pentane, neo-pentane and mixtures thereof. Specific examples of the cyclic hydrocarbon solvent include aromatic hydrocarbons such as benzene, toluene and xylene; and alicyclic hydrocarbons such as cyclohexane. From the viewpoint of controllability of the polymerization temperature and controllability of the molecular weight distributions of the polymer block formed from the aromatic vinyl monomer and of the poly(aromatic vinyl)/polyisoprene block copolymer composed of components (X), (Y) and (Z), an open-chain hydrocarbon solvent of 4 to 6 carbon atoms and a cyclic hydrocarbon solvent are preferably used by mixing them in a weight ratio of 5:95 to 50:50 and more preferably 10:90 to 40:60.

In the production process of the present invention, the polymerization may be carried out in the presence of a polar compound so as to control the polymerization rate of the aromatic vinyl monomer and the molecular weight distribution of the poly(aromatic vinyl) block. As the polar compound, an aromatic ether, aliphatic ether or tertiary amine having a dielectric constant of 2.5 to 5.0 as measured at 25° C. may preferably be used. Specific examples of such polar compounds include aromatic ethers such as diphenyl ether and anisole; aliphatic ethers such as diethyl ether and dibutyl ether; tertiary monoamine such as trimethylamine, triethylamine and tripropylamine; and tertiary polyamines such as N,N,N',N'-tetra-methylethylenediamine and N,N,N',N'-tetraethylethylene-diamine.

These polar compounds may be used in admixture of two or more. The amount of polar compound used may vary according to the type thereof. For example, aliphatic ethers are preferably used in an amount of 0.001 to 50 moles and more preferably 0.005 to 10 moles, per mole of the organolithium initiator. Tertiary polyamines are preferably used in an amount of 0.001 to 0.1 mole, more preferably 0.005 to 0.08 mole, and most preferably 0.01 to 0.06 mole, per mole of the organolithium initiator. If the amount of polar compound used is unduly small, it will be difficult to accomplish the purpose of controlling the reaction rate and the molecular weight distribution. Even if it is added in excess, the effect obtained thereby will not be in proportion to the amount added. Moreover, if an excessive amount of a tertiary polyamine is added in step (1), it will exist in excess in step (2). This may detract from the low-temperature characteristics of the resulting pressure-sensitive adhesive composition.

These polar compounds are also suitable for use as coupling accelerators in step (3) of the production process of the present invention.

Then, in step (2), isoprene is added to the polymerization system so as to form an A-B block copolymer in which a polyisoprene block B having an active polymerizing end is directly joined to the poly(aromatic vinyl) block A. In order to control the heat of reaction, it is preferable to add isoprene continuously, instead of adding it at a time.

Furthermore, in step (3), a coupling agent having a functionality of 4 or higher, preferably a tetrafunctional coupling agent, is added in order to convert 34 to 99% by weight, preferably 45 to 99% by weight, and more preferably 55 to 99% by weight of the A-B block copolymer into the four-branch polymer represented by General Formula 6. In consequence, the diblock polymer represented by General Formula 5 and constituting component (X), and the at least one branched polymer selected from the group consisting of the two-branch polymer represented by General Formula 7 and the three-branch polymer represented by General Formula 8, and constituting component (Z), may be contained in the composition. In this case, $A^5$, $A^6$, $A^7$ and $A^8$ are the same as A, and $B^5$, $B^6$, $B^7$ and $B^8$ are the same as B. Moreover, the diblock polymer may contain the A-B block copolymer having a residue of the coupling agent joined to the B end. Also in this case, the diblock polymer is dealt with as such.

The method for converting 34 to 99% by weight of the A-B block copolymer into the four-branch polymer is carried out by reacting the A-B block copolymer with the coupling agent having a functionality of 4 or higher in the presence of a coupling accelerator.

Specific examples of the coupling accelerator are the same as the compounds described above as specific examples of the polar compound.

The amount of coupling accelerator used in step (1) through step (3) (including the amount used as a polar compound) may vary according to the type thereof, the type and concentration of the coupling agent, and the like. For example, aliphatic ethers are preferably used in an amount of 0.001 to 50 moles and more preferably 0.005 to 10 moles, per mole of the organolithium initiator. Tertiary polyamines are used in an amount of 0.02 to 1 mole, preferably 0.05 to 0.5 mole, and more preferably 0.08 to 0.3 moles, per mole of the organolithium initiator. Thus, a predetermined proportion of the A-B block copolymer is converted into the four-branch polymer by controlling the reaction time or other parameters in the presence of the coupling accelerator.

No particular limitation is placed on the time at which the coupling accelerator is added to the reaction system. However, if a tertiary polyamine functioning as a polar compound in the aromatic vinyl polymerization step (1) exists in excess in the isoprene polymerization step (2), it will detract from the low-temperature characteristics of the resulting pressure-sensitive adhesive composition as described previously. Accordingly, where a tertiary polyamine is used both as a polar compound and as a coupling accelerator, it is important to control its time of addition and its amount used. For example, in the aromatic vinyl polymerization step (1), a tertiary polyamine may be added to the reaction system in such an amount as to function as a polar compound in the aromatic vinyl polymerization step (1), exert little influence on the isoprene polymerization step (2), and function as a coupling accelerator in the coupling step (3). Alternatively, in the aromatic vinyl polymerization step (1), a tertiary polyamine may be added to the reaction system in such an amount as to function as a polar compound in the aromatic vinyl polymerization step (1) and exert little influence on the isoprene polymerization step (2). Then, after the isoprene polymerization step (2), the tertiary polyamine may further be added so as to function as a coupling accelerator in the coupling step (3).

The amount of tertiary polyamine further added after step (2) is usually in the range of 0 to 0.4 mole, preferably 0.01 to 0.4 mole, and more preferably 0.01 to 0.2 mole, per mole of the organolithium initiator.

When a polar compound is added in step (1) and a coupling accelerator is further added in step (3), the coupling efficiency can be enhanced to increase the content of the four-branch polymer.

As the coupling agent having a functionality of 4 or higher, a halogenated silane is preferably used. Specific examples thereof include tetrachlorosilane and tetrabromosilane. In the present invention, these coupling agents may be used in admixture of two or more, so long as the purposes of the present invention are not interfered with. Similarly, they may be used in combination with bifunctional or trifunctional coupling agents.

In the present invention, the total amount of coupling agent used is suitably chosen so that the aforesaid components (X), (Y) and (Z) will be present in predetermined proportions. The amount of coupling agent is usually in the range of 0.05 to 0.4 mole and preferably 0.085 to 0.3 mole, per mole of the organolithium initiator.

The appropriate amount of coupling agent used can be determined by calculation according to the proportions of the four-branch polymer component and the diblock polymer component in the desired block copolymer. However, since there are problems, for example, with an inactivation of the organolithium initiator or the coupling agent, it is common practice to determine its optimum amount by preliminary experiments. In order to control the degree of coupling, a reaction stopper such as methanol may also be used as required.

In step (3), the coupling agent may be added at a time or in two or more divided portions. Preferably, the coupling agent is added in two divided portions. When the coupling agent is added in two divided portions, the first portion usually comprises 40 to 90 mole %, preferably 50 to 90 mole %, of the total amount of coupling agent used and the second portion usually comprises 10 to 60 mole %, preferably 10 to 50 mole %, of the total amount of coupling agent used. The interval of time between the two additions of the coupling agent is usually not less than 5 minutes and preferably not less than 10 minutes. The total time of the coupling reaction is usually in the range of 1 to 5 hours. By adding the coupling agents in divided portions, the time required for the coupling reaction can be markedly reduced and, moreover, a high-molecular-weight poly(aromatic vinyl)/polyisoprene block copolymer composition containing a higher proportion of a four-branch polymer can be obtained.

As soon as the coupling reaction has proceeded to an appropriate extent, the reaction is stopped. This can be accomplished, for example, by adding a reaction stopper (e.g., water, methanol or an acid) to inactivate the active polymerizing species. Subsequently, the polymer is separated, for example, by a well-known polymer separation technique such as steam stripping, and then dried to obtain the desired poly(aromatic vinyl)/polyisoprene block copolymer composition comprising the diblock polymer and the four-branch polymer.

No particular limitation is placed on the weight-average molecular weight (Mw) of the poly(aromatic vinyl)/polyisoprene block copolymer composed of components (X), (Y) and (Z) and contained in the poly(aromatic vinyl)/polyisoprene block copolymer composition produced by the production process of the present invention. However, it is usually in the range of 260,000 to 500,000.

No particular limitation is placed on the poly(aromatic vinyl) block content of the poly(aromatic vinyl)/polyisoprene block copolymer composed of components (X), (Y) and (Z) and contained in the poly(aromatic vinyl)/polyisoprene block copolymer composition produced by the production process of the present invention. However, it is usually in the range of 5 to 24% by weight.

No particular limitation is placed on the weight-average molecular weights of the poly(aromatic vinyl) blocks of components (X), (Y) and (Z) contained in the poly(aromatic vinyl)/polyisoprene block copolymer composition produced by the production process of the present invention. However, they are usually in the range of 9,000 to 20,000.

According to the production process of the present invention, the poly(aromatic vinyl)/polyisoprene block copolymer composition comprising the aforesaid components (a), (b) and (c) can preferably be produced. When the poly(aromatic vinyl)/polyisoprene block copolymer composition comprising the aforesaid components (a), (b) and (c) is produced according to the production process of the present invention, components (X), (Y) and (Z) described in connection with the production process of the present invention correspond to components (a), (b) and (c), respectively.

[Pressure-sensitive Adhesive Composition]

The pressure-sensitive adhesive composition of the present invention comprises the block copolymer composition of the present invention and a tackifier resin.

No particular limitation is placed on the type of the tackifier resin, and there may used, for example, well-known natural resin type tackifier resins and synthetic resin type tackifier resins which are used in common pressure-sensitive adhesive compositions. The natural resin type tackifier resins include rosin type resins and terpene type resins. Usable rosin type resins include, for example, rosins such as gum rosin, tall rosin and wood rosin; modified rosins such as hydrogenated rosin, disproportionated rosin and polymerized rosin; and rosin esters such as glycerol esters and pentaerythritol esters of modified rosins. Usable terpene type resins include, for example, terpene resins such as α-pinene resin, β-pinene resin and dipentene (limonene) resin, as well as aromatic modified terpene resins, hydrogenated terpene resins and terpene phenol resin. The synthetic resin type tackifier resins are broadly classified into polymerization type tackifier resins and condensation type tackifier resins. Usable polymerization type tackifier resins include petroleum resins such as aliphatic (C5 type) petroleum resins, aromatic (C9 type) petroleum resins, copolymerized (C5–C9 type) petroleum resins, hydrogenated petroleum resins, alicyclic petroleum resins (e.g., dicyclopentadiene resin and other alicyclic petroleum resins); coumarone-indene resin; and pure monomer type petroleum resins such as styrene resin and substituted styrene resins. Usable condensation type tackifier resins phenolic resins such as alkylphenol resins and rosin-modified phenol resins; xylene resins; and the like. Among them, petroleum resins are preferred. Especially preferred are alipatic (C5 type)

petroleum resins and copolymerized (C5–C9 type) petroleum resins, particularly having a softening point of 70 to 120° C. Among the copolymerized (C5–C9 type) petroleum resins, those containing 5 to 15% by weight of an aromatic monomer having 8 or 9 carbon atoms are especially preferred.

The amount of tackifier resin used is in the range of 10 to 500 parts by weight, preferably 50 to 350 parts by weight, and more preferably 70 to 250 parts by weight, per 100 parts by weight of the poly(aromatic vinyl)/polyisoprene block copolymer composition.

If necessary, the pressure-sensitive adhesive composition of the present invention may further contain compounding ingredients such as rubber components, softening agents, antioxidants, heat stabilizers, ultraviolet absorbers and fillers.

Usable rubber components include styrene-based block copolymers such as polystyrene-polybutadiene-polystyrene block copolymer, polystyrene-polyethylene-polybutylene-polystyrene block copolymer and polystyrene-polyethylene-polypropylene-polystyrene block copolymer; diene rubbers such as butadiene rubber and isoprene rubber; natural rubber; and the like. These rubber components may be used in admixture of two or more. The amount of rubber component used is not particularly limited, but may be determined according to the characteristics of each rubber component and the characteristics desired for the pressure-sensitive adhesive composition.

Usable softening agents include extender oils which have conventionally be used in pressure-sensitive adhesive compositions, such as aromatic process oils, paraffinic process oils and naphthenic process oils; liquid polymers such as polybutene and polyisobutylene; and the like. Among them, extender oils such as paraffinic process oils and naphthenic process oils are preferred. These softening agents may be used in admixture of two or more. The amount of softening agent used is preferably in the range of not greater than 500 parts by weight, more preferably not greater than 300 parts by weight, and most preferably not greater than 150 parts by weight, per 100 parts by weight of the poly(aromatic vinyl)/polyisoprene block copolymer composition. If the amount of softening agent used is unduly large, bleeding may occur.

Usable antioxidants include hindered phenol compounds such as 2,6-di-tert-butyl-p-cresol, pentaerythrityl tetrakis[3-(3,5-di-tert-butyl-4-hydroxyphenyl)propionate] and 2,4-bis(n-octylthio)-6-(4-hydroxy-3,5-di-tert-butylanilino)-1,3,5-triazine; thiodicarboxylate esters such as dilauryl thiodipropionate; phosphorous esters such as tris (nonylphenyl) phosphite and 4,4-butylidene-bis(3-methyl-6-butylphenyl) ditridecyl phosphite; and the like. These antioxidants may be used in admixture of two or more. The amount of antioxidant used may be determined according to the characteristics of each antioxidant and the characteristics desired for the pressure-sensitive adhesive composition.

Industrial Applicability

The pressure-sensitive adhesive composition of the present invention may be used as a solution type pressure-sensitive adhesive by dissolving it in n-hexane, cyclohexane, benzene, toluene or the like; as an emulsion type pressure-sensitive adhesive by dispersing it in water with the aid of an emulsifier; or as a solvent-less hot-melt type pressure-sensitive adhesive or bonding adhesive. It is especially suitable for use as a hot-melt type pressure-sensitive adhesive.

The hot-melt type pressure-sensitive adhesive is preferably used for the production of various pressure-sensitive adhesive tapes, labels, dedusting rollers and the like. For example, such pressure-sensitive adhesive tapes can be used in a wide variety of application fields including packaging, office work, double-coated tapes, masking, electrical insulation and the like, and exhibit high holding power and excellent tack at low temperatures.

Best Mode for Carrying Out the Invention

The present invention is more specifically explained with reference to the following examples.

The weight-average molecular weight of a polystyrene block is a weight-average molecular weight (Mw) on a polystyrene basis, which was determined by sampling polystyrene at the time of addition of isoprene during the production of a block copolymer and subjecting this sample to gel permeation chromatography (GPC) using tetrahydrofuran as a carrier. The weight-average molecular weight of a block copolymer composed of components (a), (b) and (c) is also a weight-average molecular weight (Mw) as determined on a polystyrene basis by gel permeation chromatography (GPC) using tetrahydrofuran as a carrier. The makeup of a copolymer composition was determined from the peak areas of various components which were recorded by the same gel permeation chromatography (GPC).

Holding power was evaluated according to PSTC-7 (a holding power test prescribed by the American Pressure Sensitive Tape Council). Specifically, a piece of pressure-sensitive adhesive tape having a width of 10 mm was adhered to paper (K-liner) so as to give a 10 mm×10 mm bonded area, and its holding power was measured at 23° C.

A paper peeling test for evaluating tack at low temperatures was carried out as follows. A pressure-sensitive adhesive tape to be tested was cut into test pieces measuring 25 mm×70 mm. At least 3 hours before the start of the test, these test pieces, together with a corrugated board as an adherend and a 500 g metal roller, was inserted into a thermostatic chamber at 5° C. The corrugated board was placed in the thermostatic chamber at 5° C., and a test piece of the pressure-sensitive adhesive tape was affixed thereto under constant conditions without applying any force thereon. The test piece was bonded under pressure by moving the metal roller thereon in a single reciprocating motion, and then peeled quickly at an angle of 90 degrees. The amount of paper fiber adhering to the peeled test piece of the pressure-sensitive adhesive tape was scored by comparison with standard samples [5 ranks ranging from 5 (fiber adhering to the whole surface of the test piece) to 1 (no fiber adhering to the test piece)]. Measurements were made with 6 test pieces, and the average of the measured values was calculated.

EXAMPLE 1

[Preparation of a Block Copolymer Composition]

A 50-liter pressure reactor was charged with 18.75 kg of cyclohexane, 4.0 millimoles of N,N,N',N'-tetramethylethylenediamine as a polar compound and a coupling accelerator, and 80.0 millimoles of n-butyllithium. After the reactor was heated to 60° C., 0.96 kg of styrene was added, and the resulting mixture was polymerized for 0.5 hour. Subsequently, while 7.04 kg of isoprene was being continuously added and the reaction temperature was being controlled so as to lie between 60° C. and 70° C., the reaction mixture was further polymerized for 1.5 hours. Then, 19.0 millimoles of tetrachlorosilane as a coupling agent was added, and a coupling reaction was carried out for 1 hour. Thereafter, 50 ml of methanol as a reaction stopper and 40 g of 2,6-di-tert-butyl-p-cresol as an antioxidant were added to the reaction mixture, followed by thorough mixing. The resulting mixed solution was added, little by little, to warm water heated to 85–95° C., so that the solvent was evaporated. The polymer so recovered was pulverized and dried in vacuo at 60° C. to obtain a block copolymer composition A in accordance with the present invention.

The styrene content of this block copolymer composition was 12% by weight, the weight-average molecular weight of the polystyrene block was 12,300, and the weight-average overall molecular weight (Mw) as determined on a polystyrene basis was 343,000. This block copolymer composition was composed of 43.7% by weight of a four-branch polymer, 37.0% by weight of a three-branch polymer, 1.7% by weight of a two-branch polymer, and 17.6% by weight of a diblock polymer.

[Pressure-sensitive Adhesive Composition]

100 parts by weight of the aforesaid block copolymer composition was placed in a kneader equipped with agitating blades. Then, 77.8 parts by weight of an aliphatic (C5 type) petroleum resin (with a softening point of 96° C.; Quinton R100, manufactured by Nippon Zeon Co., Ltd.), 7.4 parts by weight of a naphthenic process oil (Shell Flex 371, manufactured by Shell Chemical Co., Ltd.), and 0.92 part by weight of an antioxidant (Irganox 1010, manufactured by Ciba-Geigy) were added thereto. After the atmosphere of the system was replaced by nitrogen gas, the mixture was kneaded at 160–180° C. to prepare a pressure-sensitive adhesive composition. A polyester film having a thickness of 30 μm was coated with the pressure-sensitive adhesive composition to a thickness of 30 μm, and used for the evaluation of its adhesive properties. The results thus obtained are shown in Table 1.

EXAMPLE 2

A 50-liter pressure reactor was charged with 18.75 kg of cyclohexane, 4.1 millimoles of tetramethylethylenediamine as a polar compound, and 82.7 millimoles of n-butyllithium. After the reactor was heated to 60° C., 0.96 kg of styrene was added, and the resulting mixture was polymerized for 0.5 hour. Subsequently, while 7.04 kg of isoprene was being continuously added and the reaction temperature was being controlled so as to lie between 60° C. and 70° C., the reaction mixture was further polymerized for 1.5 hours. Then, 4.1 millimoles of N,N,N',N'-tetramethylethylenediamine and 17.8 millimoles of tetrachlorosilane as a coupling agent were added, and a coupling reaction was carried out for 1 hour. Thereafter, according to the same procedure as in Example 1, a reaction stopper and an antioxidant were added to the reaction mixture, the solvent was evaporated, and the resulting polymer was pulverized and dried to obtain a block copolymer composition B. Properties of this block copolymer composition were evaluated. Moreover, using this block copolymer composition, a pressure-sensitive adhesive composition was prepared in the same manner as in Example 1, and its adhesive properties were evaluated. The results thus obtained are shown in Table 1.

EXAMPLE 3

A 50-liter pressure reactor was charged with 18.75 kg of cyclohexane, 3.6 millimoles of tetramethylethylenediamine as a polar compound, and 71.6 millimoles of n-butyllithium. After the reactor was heated to 60° C., 0.88 kg of styrene was added, and the resulting mixture was polymerized for 0.5 hour. Subsequently, while 7.12 kg of isoprene was being continuously added and the reaction temperature was being controlled so as to lie between 60° C. and 70° C., the reaction mixture was further polymerized for 1.5 hours. Then, 3.6 millimoles of tetramethylethylenediamine as a coupling accelerator and 17.8 millimoles of tetrachlorosilane as a coupling agent were added, and a coupling reaction was carried out for 3 hours. Thereafter, according to the same procedure as in Example 1, a reaction stopper and an antioxidant were added to the reaction mixture, the solvent was evaporated, and the resulting polymer was pulverized and dried to obtain a block copolymer composition C. Properties of this block copolymer composition were evaluated.

100 parts by weight of this block copolymer composition was placed in a kneader equipped with agitating blades. Then, 85.2 parts by weight of a copolymerized (C5–C9 type) petroleum resin (with a softening point of 80° C.; Quinton N180, manufactured by Nippon Zeon Co., Ltd.) and 0.92 part by weight of an antioxidant (Irganox 1010, manufactured by Ciba-Geigy) were added thereto. After the atmosphere of the system was replaced by nitrogen gas, the mixture was kneaded at 160–180° C. to prepare a pressure-sensitive adhesive composition. Adhesion properties of this pressure-sensitive adhesive composition were evaluated in the same manner as in Example 1. The results thus obtained are shown in Table 1.

EXAMPLE 4

A 50-liter pressure reactor was charged with 18.75 kg of cyclohexane, 4.2 millimoles of tetramethylethylenediamine as a polar compound, and 84.6 millimoles of n-butyllithium. After the reactor was heated to 60° C., 1.04 kg of styrene was added, and the resulting mixture was polymerized for 0.5 hour. Subsequently, while 6.96 kg of isoprene was being continuously added and the reaction temperature was being controlled so as to lie between 60° C. and 70° C., the reaction mixture was further polymerized for 1.5 hours. Then, 4.2 millimoles of tetramethylethylenediamine as a coupling accelerator and 16.8 millimoles of tetrachlorosilane as a coupling agent were added, and a coupling reaction was carried out for 1 hour. Thereafter, according to the same procedure as in Example 1, a reaction stopper and an antioxidant were added to the reaction mixture, the solvent was evaporated, and the resulting polymer was pulverized and dried to obtain a block copolymer composition D. Properties of this block copolymer composition were evaluated.

100 parts by weight of this block copolymer composition was placed in a kneader equipped with agitating blades. Then, 85.2 parts by weight of a copolymerized (C5–C9 type) petroleum resin (with a softening point of 80° C.; Quinton N180, manufactured by Nippon Zeon Co., Ltd.) and 0.92 part by weight of an antioxidant (Irganox 1010, manufactured by Ciba-Geigy) were added thereto. After the atmosphere of the system was replaced by nitrogen gas, the mixture was kneaded at 160–180° C. to prepare a pressure-sensitive adhesive composition. Adhesion properties of this pressure-sensitive adhesive composition were evaluated in the same manner as in Example 1. The results thus obtained are shown in Table 1.

EXAMPLE 5

A 50-liter pressure reactor was charged with 18.75 kg of cyclohexane, 4.7 millimoles of tetramethylethylenediamine as a polar compound, and 94.9 millimoles of n-butyllithium. After the reactor was heated to 60° C., 1.12 kg of styrene was added, and the resulting mixture was polymerized for 0.5 hour. Subsequently, while 6.88 kg of isoprene was being continuously added and the reaction temperature was being controlled so as to lie between 60° C. and 70° C., the reaction mixture was further polymerized for 1.5 hours. Then, 4.7 millimoles of tetramethylethylenediamine and 16.6 millimoles of tetrachlorosilane as a coupling agent were added, and a coupling reaction was carried out for 1 hour. Thereafter, according to the same procedure as in Example 1, a reaction stopper and an antioxidant were added to the reaction mixture, the solvent was evaporated, and the resulting polymer was pulverized and dried to obtain a block copolymer composition E. Properties of this block copolymer composition were evaluated.

100 parts by weight of this block copolymer composition was placed in a kneader equipped with agitating blades. Then, 85.2 parts by weight of an aliphatic (C5 type) petroleum resin (with a softening point of 70° C.; Quinton B170, manufactured by Nippon Zeon Co., Ltd.) and 0.92 part by weight of an antioxidant (Irganox 1010, manufactured by Ciba-Geigy) were added thereto. After the atmosphere of the system was replaced by nitrogen gas, the mixture was kneaded at 160–180° C. to prepare a pressure-sensitive adhesive composition. Adhesion properties of this pressure-sensitive adhesive composition were evaluated in the same manner as in Example 1. The results thus obtained are shown in Table 1.

EXAMPLE 6

A 30-liter pressure reactor was charged with 18.75 kg of cyclohexane, 1.3 millimoles of N,N,N',N'-tetramethylethylenediamine as a polar compound, and 87.3 millimoles of n-butyl lithium. After the reactor was heated to 60° C., 0.96 kg of styrene was added, and the resulting mixture was polymerized for 0.5 hour. Subsequently, while 7.04 kg of isoprene was being continuously added and the reaction temperature was being controlled so as to lie between 60° C. and 70° C., the reaction mixture was further polymerized for 1.5 hours. Then, 8.7 millimoles of N,N,N',N'-tetramethylethylenediamine as a coupling accelerator, and 17.5 millimoles of tetrachlorosilane as a coupling agent were added, and a coupling reaction was carried out for 15 minutes. Then, 4.4 millimoles of tetrachlorosilane was added and the coupling reaction was continued for an additional 45 minutes. Thereafter, a block copolymer composition F was obtained in the same manner as in Example 1. Moreover, a pressure-sensitive adhesive composition was prepared in the same manner as in Example 1, and its adhesive properties were evaluated. The results thus obtained are shown in Table 1.

EXAMPLE 7

A block copolymer G was obtained by carrying out reaction in the same manner as in Example 6, except that 85.7 millimoles of n-butyllithium was used, 8.6 millimoles of N,N,N',N'-tetramethylethy lenediamine as a coupling accelerator and 17.1 millimoles of tetrachlorosilane as a coupling agent were added after the polymerization of isoprene, and 8.6 millimoles of tetrachlorosilane was further added after 15 minutes. Moreover, a pressure-sensitive adhesive composition was prepared in the same manner as in Example 1, and its adhesive properties were evaluated. The results thus obtained are shown in Table 1.

EXAMPLE 8

A block copolymer H was obtained by carrying out reaction in the same manner as in Example 6, except that 84.9 millimoles of n-butyllithium was used, 8.5 millimoles of N,N,N',N'-tetramethylethylenediamine as a coupling accelerator and 12.7 millimoles of tetrachlorosilane as a coupling agent were added after the polymerization of isoprene, and 5.9 millimoles of tetrachlorosilane was further added after 15 minutes. Moreover, a pressure-sensitive adhesive composition was prepared in the same manner as in Example 1, and its adhesive properties were evaluated. The results thus obtained are shown in Table 1.

EXAMPLE 9

A block copolymer I was obtained by carrying out reaction in the same manner as in Example 6, except that 1.8 millimoles of N,N,N',N'-tetramethylethylenediamine as a polar compound, 121.6 millimoles of n-butyllithium, 1.52 kg of styrene, and 6.48 kg of isoprene were used, 12.2 millimoles of N,N,N',N'-tetramethylethylenediamine as a coupling accelerator and 24.3 millimoles of tetrachlorosilane as a coupling agent were added, and 6.1 millimoles of tetrachlorosilane was further added after 15 minutes.

EXAMPLES 10 and 11

Pressure-sensitive adhesive compositions as shown in Table 1 were prepared by using the block copolymer C obtained in Example 3, and their adhesive properties were evaluated. The results thus obtained are shown in Table 1.

Comparative Example 1

A 50-liter pressure reactor was charged with 18.75 kg of cyclohexane, 1.2 millimoles of N,N,N',N'-tetramethylethylenediamine as a polar compound, and 81.3 millimoles of n-butyllithium. After the reactor was heated to 60° C., 0.96 kg of styrene was added, and the resulting mixture was polymerized for 0.5 hour. Subsequently, while 7.04 kg of isoprene was being continuously added and the reaction temperature was being controlled so as to lie between 60° C. and 70° C., the reaction mixture was further polymerized for 1.5 hours. Then, 18.8 millimoles of tetrachlorosilane was added, and a coupling reaction was carried out for 1 hour. Thereafter, according to the same procedure as in Example 1, a reaction stopper and an antioxidant were added to the reaction mixture, the solvent was evaporated, and the resulting polymer was pulverized and dried to obtain a block copolymer composition J. Properties of this block copolymer composition were evaluated. Moreover, using this block copolymer composition, a pressure-sensitive adhesive composition was prepared in the same manner as in Example 1, and its adhesive properties were evaluated. The results thus obtained are shown in Table 1.

Comparative Examples 2 to 4

Using three commercially available polystyrene-polyisoprene-polystyrene block copolymer compositions K, L and M, pressure-sensitive adhesive compositions were prepared according to the formulations shown in Table 1, and their characteristics and adhesive properties were evaluated in the same manner as before. The results thus obtained are shown in Table 1.

Comparative Example 5

A 50-liter pressure reactor was charged with 18.75 kg of cyclohexane, and 95.3 millimoles of sec-butyllithium. After the reactor was heated to 60° C., 1.68 kg of styrene was added, and the resulting mixture was polymerized for 0.5 hour. Subsequently, while 6.32 kg of isoprene was being continuously added and the reaction temperature was being controlled so as to lie between 60° C. and 70° C., the reaction mixture was further polymerized for 1.5 hours. Then, 0.02 kg of butadiene was added and polymerized. Moreover, 23.9 millimoles of tetrachlorosilane was added, and a coupling reaction was carried out for 1 hour. Thereafter, according to the same procedure as in Example 1, a reaction stopper and an antioxidant were added to the reaction mixture, the solvent was evaporated, and the resulting polymer was pulverized and dried to obtain a block copolymer composition N. Properties of this block copolymer composition were evaluated. Moreover, using this block copolymer composition, a pressure-sensitive adhesive composition was prepared in the same manner as in Example 1, and its adhesive properties were evaluated. The results thus obtained are shown in Table 1.

TABLE 1

| | Example | | | | | | | |
|---|---|---|---|---|---|---|---|---|
| | 1 | 2 | 3 | 4 | 5 | 6 | 7 | 8 |
| Block copolymer composition | A | B | C | D | E | F | G | H |
| Styrene content (wt. %) | 12 | 12 | 11 | 13 | 14 | 12 | 12 | 12 |
| Weight-average molecular weight of polystyrene block of block copolymer composed of components (a), (b) and (c) | 12,300 | 11,900 | 12,600 | 12,600 | 12,100 | 11,300 | 11,500 | 11,600 |
| Weight-average molecular weight of block copolymer composed of components (a), (b) and (c) | 343,000 | 339,000 | 438,000 | 312,000 | 276,000 | 414,000 | 409,000 | 405,000 |
| (a) Diblock polymer (wt. %) | 17.6 | 20.3 | 7.3 | 27.8 | 32.3 | 4.1 | 3.4 | 11.3 |
| (b) Four-branch polymer (wt. %) | 43.7 | 61.1 | 72.4 | 52.3 | 60.6 | 72.4 | 62.9 | 83.2 |
| Two-branch polymer (wt. %) | 1.7 | 0 | 0 | 0.8 | 0 | 0 | 1.3 | 0 |
| Three-branch polymer (wt. %) | 37.0 | 18.6 | 20.3 | 19.1 | 7.1 | 23.5 | 32.4 | 5.5 |
| (c) Two-branch polymer + three-branch polymer (wt. %) | 38.7 | 18.6 | 20.3 | 19.9 | 7.1 | 23.5 | 33.7 | 5.5 |
| Formulation of pressure-sensitive adhesive composition | | | | | | | | |
| Block copolymer (parts by weight) | 100 | 100 | 100 | 100 | 100 | 100 | 100 | 100 |
| Tackifier resin (parts by weight) | | | | | | | | |
| Aliphatic (C5 type) petroleum resin | 77.8 | 77.8 | 0 | 0 | 85.2 | 77.8 | 77.8 | 77.8 |
| Softening point | 96° C. | 95° C. | | | 70° C. | 96° C. | 96° C. | 96° C. |
| Copolymerized (C5–C9 type) petroleum resin | | | 85.2 | 85.2 | | | | |
| Softening point | | | 80° C. | 80° C. | | | | |
| Copolymerized petroleum resin A | | | | | | | | |
| Softening point | | | | | | | | |
| Copolymerized petroleum resin B | | | | | | | | |
| Softening point | | | | | | | | |
| Naphthenic process oil (parts by weight) | 7.4 | 7.4 | 0 | 0 | 0 | 7.4 | 7.4 | 7.4 |
| Antioxidant (parts by weight) | 0.92 | 0.92 | 0.92 | 0.92 | 0.92 | 0.92 | 0.92 | 0.92 |
| Characteristics of pressure-sensitive adhesive composition | | | | | | | | |
| Holding power (min.) | 1230 | 1520 | 1680 | 1470 | 1120 | 4870 | 4220 | 2670 |
| Paper peeling test | 3.5 | 3.5 | 4 | 3.5 | 3 | 3.5 | 3.5 | 3.5 |

| | Example | | | Comparative Example | | | | |
|---|---|---|---|---|---|---|---|---|
| | 9 | 10 | 11 | 1 | 2 | 3 | 4 | 5 |
| Block copolymer composition | I | C | C | J | K | L | M | N |
| Styrene content (wt. %) | 19 | 11 | 11 | 12 | 30 | 19 | 14 | 21 |
| Weight-average molecular weight of polystyrene block of block copolymer composed of components (a), (b) and (c) | 12,800 | 12,600 | 12,600 | 12,100 | 15,700 | 11,500 | 10,700 | 17,800 |
| Weight-average molecular weight of block copolymer composed of components (a), (b) and (c) | 327,000 | 438,000 | 438,000 | 298,000 | 167,000 | 196,000 | 237,000 | 355,000 |
| (a) Diblock polymer (wt. %) | 3.8 | 7.3 | 7.3 | 21.7 | 28.1 | 30.1 | 12.4 | 6.7 |
| (b) Four-branch polymer (wt. %) | 74.7 | 72.4 | 72.4 | 7.9 | 0 | 15.3 | 3.5 | 70.5 |
| Two-branch polymer (wt. %) | 0 | 0 | 0 | 3.8 | 2.2 | 0 | 59.7 | 0 |
| Three-branch polymer (wt. %) | 21.5 | 20.3 | 20.3 | 57.7 | 69.7 | 54.6 | 24.4 | 22.8 |
| (c) Two-branch polymer + three-branch polymer (wt. %) | 21.5 | 20.3 | 20.3 | 61.5 | 71.9 | 54.6 | 84.1 | 22.8 |
| Formulation of pressure-sensitive adhesive composition | | | | | | | | |
| Block copolymer (parts by weight) | — | 100 | 100 | 100 | 100 | 100 | 100 | 100 |
| Tackifier resin (parts by weight) | | | | | | | | |
| Aliphatic (C5 type) petroleum resin | | | | 77.8 | 100 | 100 | 77.8 | 100 |

TABLE 1-continued

| | | | | | | | | |
|---|---|---|---|---|---|---|---|---|
| Softening point Copolymerized (C5–C9 type) petroleum resin | | | 96° C. | 96° C. | 96° C. | 96° C. | 96° C. | |
| Softening point Copolymerized petroleum resin A | 77.8 | | | | | | | |
| Softening point | 95° C. | | | | | | | |
| Copolymerized petroleum resin B | | 85.2 | | | | | | |
| Softening point | | 80° C. | | | | | | |
| Naphthenic process oil (parts by weight) | 7.4 | 0 | 7.4 | 38.1 | 38.1 | 7.4 | 38.1 | |
| Antioxidant (parts by weight) | 0.92 | 0.92 | 0.92 | 0.92 | 0.92 | 0.92 | 0.92 | |
| Characteristics of pressure-sensitive adhesive composition | | | | | | | | |
| Holding power (min.) | — | 2010 | 1750 | 770 | 850 | 320 | 640 | 470 |
| Paper peeling test | — | 4.5 | 4.5 | 3.5 | 1 | 2 | 3 | 1 |

When the makeup of the block copolymer compositions of Examples 1–11 is compared with that of the block copolymer compositions of Comparative Examples 1–4, the content of a diblock polymer constituting component (a) is in the range of 1 to 34% by weight for all compositions, but the two groups of compositions differ in the contents of components (b) and (c). Specifically, in the compositions of Examples 1–11, the content of a four-branch polymer constituting component (b) is in the range of 34 to 99% by weight, and the total content of two-branch and three-branch polymers constituting component (c) is not greater than 50% by weight and less than the content of component (b). However, in the compositions of Comparative Examples 1–4, the content of a four-branch polymer constituting component (b) is less than 34% by weight, and the content of component (c) is greater than 50% by weight. Owing to this difference in makeup, the pressure-sensitive adhesive compositions of Examples 1–11 have excellent holding power as evidenced by values of greater than 1,100 minutes, and exhibit excellent paper peeling test results as evidenced by scores of 3 or greater, whereas the pressure-sensitive adhesive compositions of Comparative Examples 1–4 have a holding power value of not greater than 850 minutes and show a paper peeling test score of not greater than 3.5. Among the pressure-sensitive adhesive compositions of Comparative Examples 1–4, that of Comparative Examples 2 has the highest holding power value (850 minutes), but shows a paper peeling test score of 1. On the other hand, those of Comparative Examples 1 and 4 show relatively high paper peeling test scores (3.5 and 3), but have holding power values of 770 and 640 which are lower as compared with Examples 1–11. From these facts, it can be seen that the pressure-sensitive adhesive compositions of the present invention have excellent holding power and exhibit excellent paper peeling test results.

Moreover, it can also be seen that the pressure-sensitive adhesive compositions of Examples 1–11 are more excellent in holding power and paper peeling test results, as compared with the pressure-sensitive adhesive composition of Comparative Example 5 in which polybutadiene was introduced at one end of a diblock copolymer.

What is claimed is:

1. A mixture of poly(aromatic vinyl)/polyisoprene block copolymers comprising 1 to 34% by weight of a diblock polymer represented by the following General Formula 1 and referred to as component (a), 34 to 99% by weight of a four-branch polymer represented by the following General Formula 2 and referred to as component (b), and 0 to 50% by weight of at least one branched polymer selected from the group consisting of a two-branch polymer represented by the following General Formula 3 and a three-branch polymer represented by the following General Formula 4, and preferred to as component (c), wherein the poly(aromatic vinyl)/polyisoprene block copolymer composed of component (a), component (b) and component (c) and contained in the poly(aromatic vinyl)/polyisoprene block copolymer composition has a weight-average molecular weight (Mw) of 260,000 to 500,000, and the poly(aromatic vinyl)/polyisoprene block copolymer composed of component (a), component (b) and component (c) and contained in the poly(aromatic vinyl)/polyisoprene block copolymer composition has a poly(aromatic vinyl) block content of 5 to 24% by weight:

$$A^1\text{-}B^1 \qquad \text{General Formula 1:}$$

wherein $A^1$ is a poly(aromatic vinyl) block having a weight-average molecular weight (Mw) of 9,000 to 20,000, and $B^1$ is a polyisoprene block;

$$(A^2\text{-}B^2)_4X^2 \qquad \text{General Formula 2:}$$

wherein $A^2$ is a poly(aromatic vinyl) block having a weight-average molecular weight (Mw) of 9,000 to 20,000, $B^2$ is a polyisoprene block, and $X^2$ is a residue of a coupling agent having a functionality of 4 or higher;

$$(A^3\text{-}B^3)_2X^3 \qquad \text{General Formula 3:}$$

wherein $A^3$ is a poly(aromatic vinyl) block, $B^3$ is a polyisoprene block, and $X^3$ is a residue of a coupling agent having a functionality of 2 or higher;

$$(A^4\text{-}B^4)_3X^4 \qquad \text{General Formula 4:}$$

wherein $A^4$ is a poly(aromatic vinyl) block, $B^4$ is a polyisoprene block, and $X^4$ is a residue of a coupling agent having a functionality of 3 or higher, with the proviso that the amount of the two-branch polymer is not greater than 10% by weight.

2. A mixture of poly(aromatic vinyl)/polyisoprene block copolymers as claimed in claim 1 wherein the poly(aromatic vinyl)/polyisoprene block copolymer composed of component (a), component (b) and component (c) has a weight-average molecular weight (Mw) of 260,000 to 470,000.

3. A mixture of poly(aromatic vinyl)/polyisoprene block copolymers as claimed in claim 1 wherein the content of component (a) is in the range of 1 to 30% by weight.

4. A mixture of poly(aromatic vinyl)/polyisoprene block copolymers as claimed in claim 1 wherein the content of component (b) is in the range of 45 to 99% by weight.

5. A mixture of poly(aromatic vinyl)/polyisoprene block copolymers as claimed in claim 4, wherein the content of component (b) based on the total amount of components other than the diblock polymer constituting component (a) is not less than 50% by weight.

6. A mixture of poly(aromatic vinyl)/polyisoprene block copolymers as claimed in claim 1 wherein the content of component (c) is in the range of 0 to 40% by weight.

7. A mixture of poly(aromatic vinyl)/polyisoprene block copolymers as claimed in claim 1 wherein the poly(aromatic vinyl) blocks $A^1$, $A^2$, $A^3$ and $A^4$ have a weight-average molecular weight of 9,500 to 17,000.

8. (Amended) A mixture of poly(aromatic vinyl)/polyisoprene block copolymers as claimed in claim 1 wherein the poly(aromatic vinyl)/polyisoprene block copolymer composed of component (a), component (b) and component (c) has a poly(aromatic vinyl) block content of 10 to 18% by weight.

9. A pressure-sensitive adhesive composition comprising a mixture of poly(aromatic vinyl)/polyisoprene block copolymers as claimed in claim 1, and a tackifier resin.

10. A process for producing a mixture of poly(aromatic vinyl)/polyisoprene block copolymers as claimed in claim 1, the process comprising the steps of (1) forming a poly(aromatic vinyl) block A having an active polymerizing end, (2) adding isoprene so as to form an A-B block copolymer in which a polyisoprene block B having an active polymerizing end is directly joined to the poly(aromatic vinyl) block A, and (3) reacting the A-B block copolymer with a coupling agent having a functionality of 4 or higher in the presence of a coupling accelerator so as to convert 34 to 99% by weight of the A-B block copolymer into the four-branch polymer represented by General Formula 2.

11. A process as claimed in claim 10 wherein, in the step (3) of reaoting the A-B block copolymer with a coupling agent having a functionality of 4 or higher in the presence of a coupling accelerator so as to component 34 to 99% by weight of the A-B block copolymer into the four-branch polymer represented by General Formula 6, the coupling agent is added in two or more divided portions.

12. A process as claimed in claim 11, wherein the coupling agent is added in two divided portions.

13. A process as claimed in claim 11 wherein the coupling agent is added in two divided portions in which the first portion comprises 40 to 90 mole % of the total amount of coupling agent used and the second portion comprises 10 to 60 mole % of the total amount of coupling agent used.

14. A process as claimed in claim 13, wherein the first portion comprises 50–90 mole % of the total amount of coupling agent used and the second portion comprises 10–50 mole % of the total amount of coupling agent used.

15. A process for producing a mixture of poly(aromatic vinyl)/polyisoprene block copolymers comprising 1 to 34% by weight of a diblock polymer represented by the following General Formula 5 and referred to as component (X), 34 to 99% by weight of a four-branch polymer represented by the following General Formula 6 and referred to as component (Y), and 0 to 50% by weight of at least one branched polymer selected from the group consisting of a two-branch polymer represented by the following General Formula 7 and a three-branch polymer represented by the following General Formula 8, and referred to as component (Z), the process comprising the steps of (1) bringing an organolithium initiator into contact with an aromatic vinyl monomer to form a poly(aromatic vinyl) block A having an active polymerizing end, (2) adding isoprene so as to form an A-B block copolymer in which a polyisoprene block B having an active polymerizing end is directly joined to the poly(aromatic vinyl) block A, and (3) reacting the A-B block copolymer with a halogenated silane coupling agent having a functionality of 4 or higher in the presence of a coupling accelerator so as to convert 34 to 99% by weight of the A-B block copolymer into the four-branch polymer represented by General Formula 6:

$$A^5\text{-}B^5 \qquad \text{General Formula 5:}$$

wherein $A^6$ is a poly(aromatic vinyl) block, and $B^5$ is a polyisoprene block;

$$(A^6\text{-}B^6)_4 X^6 \qquad \text{General Formula 6:}$$

wherein $A^6$ is a poly(aromatic vinyl) block, $B^6$ is a polyisoprene block, and $X^6$ is a residue of a coupling agent having a functionality of 4 or higher;

$$(A^7\text{-}B^7)_2 X^7 \qquad \text{General Formula 7:}$$

wherein $A^7$ is a poly(aromatic vinyl) block, $B^7$ is a polyisoprene block, and $X^7$ is a residue of a coupling agent having a functionality of 2 or higher;

$$(A^8\text{-}B^8)_3 X^8 \qquad \text{General Formula 8:}$$

wherein $A^8$ is a poly(aromatic vinyl) block, $B^8$ is a polyisoprene block, and $X^8$ is a residue of a coupling agent having a functionality of 3 or higher, with the proviso that the amount of the two-branch polymer is not greater than 10% by weight.

16. A process as claimed in claim 15, wherein the coupling accelerator is at least one compound selected from the group consisting of an aromatic ether, an aliphatic ether, a tertiary monoamine and a tertiary polyamine.

17. A process as claimed in claim 15 wherein the tertiary polyamine is N,N,N',N'-tetramethylethylenediamine or N,N,N',N'-tetraethylethylenediamine.

18. A process as claimed in claim 17 wherein the total amount of tertiary polyamine used in step (1) through step (3) is in the range of 0.02 to 1 mole, per mole of the organolithium initiator.

19. A process as claimed in claim 17 wherein the coupling accelerator is added in step (1) and further added after step (2).

20. A process as claimed in claim 19 wherein the amount of tertiary polyamine further added after step (2) is in the range of 0 to 0.4 mole, per mole of the organolithium initiator.

21. A process as claimed in claim 15 wherein the tetrafunctional silane compound is at least one compound selected from the group consisting of tetrachlorosilane, tetrabromosilane, tetramethoxysilane and tetraethoxysilane.

22. A process as claimed in claim 15 wherein the total amount of coupling agent used is in the range of 0.05 to 0.4 mole, per mole of the organolithium initiator.

23. A process as claimed in claim 22, wherein the total amount of coupling agent used is in the range of 0.085 to 0.3 mole, per mole of the organolithium initiator.

* * * * *